United States Patent [19]
Unger et al.

[11] 3,809,285
[45] May 7, 1974

[54] ELECTRIC COFFEE PERCOLATOR

[75] Inventors: John J. Unger, Elmhurst; Robert J. Augustine, Downers Grove; Farees U. Khaja, Chicago, all of Ill.

[73] Assignee: Sunbeam Corporation, Chicago, Ill.

[22] Filed: May 30, 1972

[21] Appl. No.: 258,025

Related U.S. Application Data

[62] Division of Ser. No. 51,193, June 30, 1970, Pat. No. 3,682,089.

[52] U.S. Cl.............................. 220/94 R, 222/465
[51] Int. Cl............................................. B65d 25/28
[58] Field of Search.................. 220/94 R, 96, 55 T; 222/83, 325, 465, 469, 470, 472–474; 294/27, 31, 32; 99/323

[56] References Cited
UNITED STATES PATENTS

| 1,685,560 | 9/1928 | Trulock | 220/55.7 |
| 2,896,812 | 7/1959 | Paprocki | 220/94 R |
| 3,115,916 | 12/1963 | Stephens | 220/94 R |
| 3,558,023 | 1/1971 | Yoshito | 220/94 R |
| 3,400,860 | 9/1968 | Collins | 222/46 S |
| 3,154,227 | 10/1964 | Anderson et al. | 222/46 S |

Primary Examiner—George E. Lowrance
Assistant Examiner—Allan N. Shoap
Attorney, Agent, or Firm—George R. Clark; Neil M. Rose; John S. Pacocha

[57] ABSTRACT

An electric coffee percolator having a glass vessel with an opening in the bottom through which a metallic well for a pump assembly extends. Associated with the well are electric heating elements for both operating the percolator pump and keeping the contents of the vessel warm after coffee making has been completed. The seal between the metallic heater and well portion and the glass vessel is accomplished by an annular gasket which is of sustantial vertical height and includes an undercut at the lower edge thereof to receive and lock the glass vessel portion in sealed engagement with the metallic well portion. All of the functional parts enclosed in the base of the percolator including the thermostat, the main heating element, and the keep warm heater are supported in a unitary assembly which rests upon a plastic base from which the handle is also supported. The upper portion of the handle includes a simple latch which detachably engages the upper edge of the glass vessel, the latch actuating portion being easily accessible to the hand of the user and in its released position being substantially exposed so as to warn the user that the latch is not engaged with the glass vessel.

7 Claims, 6 Drawing Figures

PATENTED MAY 7 1974

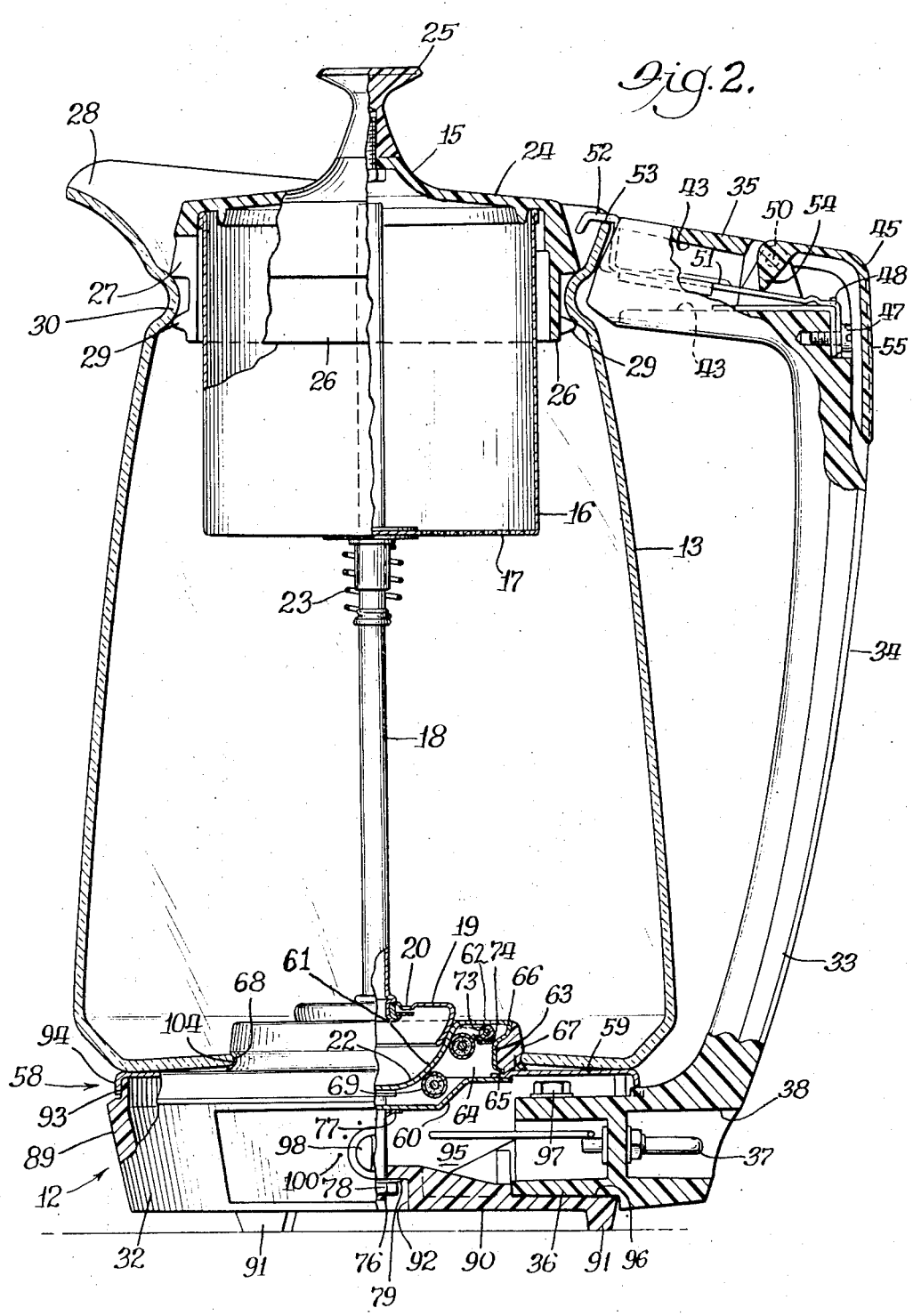

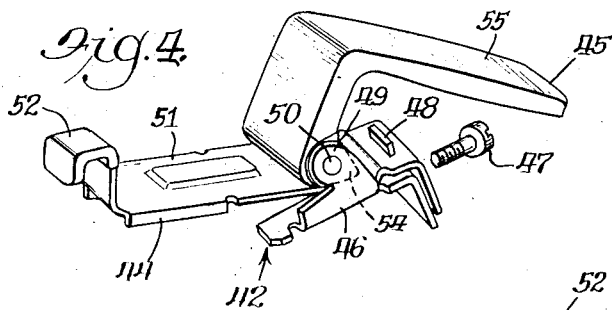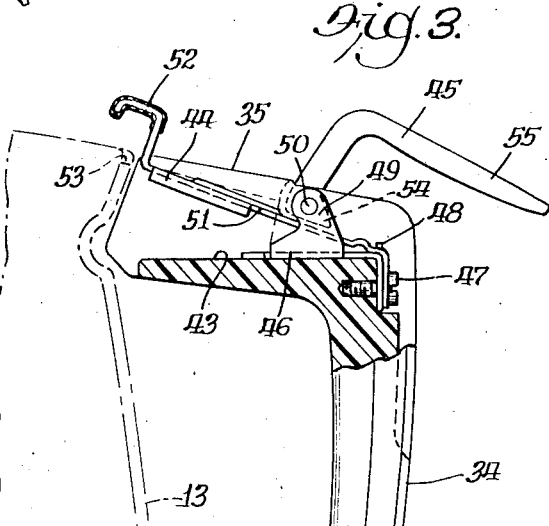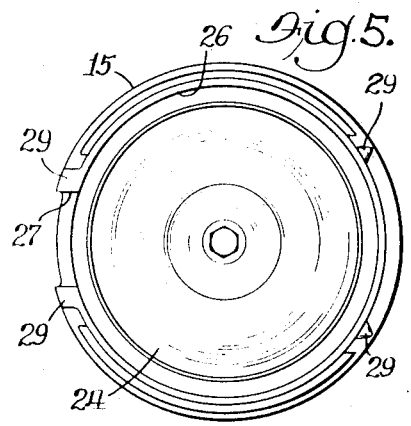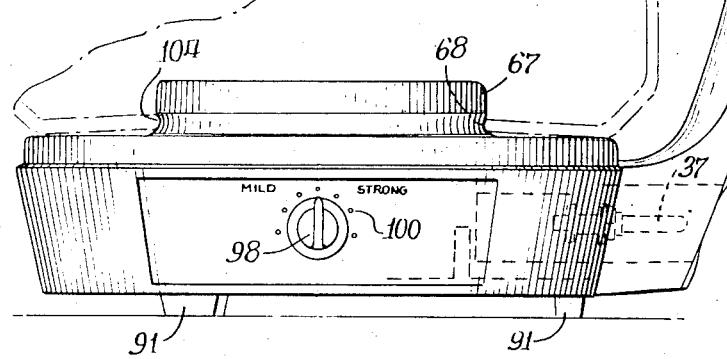

ELECTRIC COFFEE PERCOLATOR

BACKGROUND OF THE INVENTION

This application is a division of U.S. application Ser. No. 51,193, filed June 30, 1970 now U.S. Pat. No. 3,682,089, patented August 8, 1972.

During the past twenty years there has been a tremendous increase in the popularity of the percolator type of coffeemaker which is now conventionally made of either a stainless steel, aluminum or chromium plated brass. Prior to this increase in popularity of the percolator, glass vessel vacuum type and drip type coffeemakers were predominant in the home coffee making area. The glass vessel coffeemaker had the definite appeal because of the cleanliness associated with the glass vessels and the feeling on the part of the public that the glass vessels would have no effect on the taste of the coffee.

In making an electric percolator, however, it is necessary to provide a heating element associated with a pump well which will provide the percolating or pumping action. The easiest means of mounting an electric heater in good heat transfer relation to the pump was through the use of a metallic vessel having a heating element brazed or otherwise secured to the bottom thereof. While this provided an inexpensive approach to an electric percolator, the consumer has been less than happy with the thought of using a metallic vessel in connection with the brewing of coffee. This feeling persists even though stainless steel and chromium plated metal vessels produce no measurable taste difference in coffee made in vessels of these metals.

There are examples in the prior art of glass vessel percolators having a metallic well for the pump well which extends through an opening in the bottom of the glass vessel so as to operate the pump contained within the vessel. The U.S. Pat. to Rodrick et al. No. 3,093,061 is one example of such an electric percolator. One of the problems associated with the Roderick et al. patent is that the glass vessel portion and the base enclosing the heater and thermostatic controls were not easily separable to permit washing of the vessel. The U.S. Pat. to Olds No. 2,003,490 disclosed a percolator in which means were provided to detachably connect the glass vessel to the base and percolator pump so that the vessel could be removed for cleaning purposes. Although the prior art discloses the broad idea of having an electric percolator with a glass vessel which is detachable from the metallic wall and base portion thereof, there are many problems associated with a coffeemaker construction of this type which have not been adequately solved heretofore. Since the effect of metallic vessels on the taste of coffee is very questionable and considering the fact that the consumer's preference for glass vessels may be largely emotional, it is important that an electric glass percolator function as well as a corresponding metallic vessel percolator and also that it sell in approximately the same price range. If these price and functional objectives cannot be achieved, the market for the glass percolator is very limited.

One of the principal problems associated with the glass vessel percolator having a metallic well for the pump is that of providing a satisfactory seal between the glass vessel and the metallic pump which seal may be readily broken or separated when the glass vessel is detached from the base portion of the coffeemaker. In addition, it is desirable to provide a latch of some type to hold the glass vessel portion in assembled relation to the base portion which includes the metallic well. Recognizing the dangers involved in having the vessel detached from the base or becoming unsealed from the well when the vessel is filled with hot coffee, it is important that the latch be one that is positive in its action and one which the user may readily determine whether or not it is properly engaged.

In most electric percolators it is fairly difficult to arrange the main heating element which causes the percolating or pumping action and the keep warm heater in such a way that there is no repercolating of the coffee when the coffeemaker is left energized for substantial periods of time after the coffee making has been completed. Because of the limitations imposed by the combined glass vessel and metallic well construction, this problem of arranging the keep warm heater and the main heater to properly accomplish their functions is magnified considerably. While the problem of sealing between the glass vessel and the metallic pump well is increased with any increase in diameter of the metallic well portion, it is important that both the keep warm and the main heating element or pump heater be positioned to perform their respective functions properly.

SUMMARY OF THE INVENTION

The invention relates to an electric precolator having a glass vessel which is sealed to a metallic pump well and heater by means of an annular vertically extending gasket which is recessed so that the glass vessel slides into an undercut area providing a positive seal and lock between the glass vessel and the metallic well.

In order to latch the glass vessel to the metallic well and base portion of the coffeemaker, the upwardly extending handle carried by the base includes a simple latch which applies pressure downwardly on the glass vessel by means of an L-shaped lever which lies in a recess in the handle in the engaged position of the latch and extends outwardly for convenient thumb operation when the latch is in its disengaged position. The latch itself consists of a simple one piece member which is secured to the handle and is self-biased to a disengaged position. The operating lever simply pivots the latch member into engagement with the vessel with the resilience of the lever providing the biasing force against the glass vessel.

Accordingly, it is an object of the present invention to provide an improved electric percolator having a glass vessel and a metallic well which is detachably sealed to the bottom of the glass vessel.

It is another object of the present invention to provide an electric percolator having a glass vessel portion which is detachably secured to the base portion by means of an improved handle latch.

It is another object of the present invention to provide an improved electric percolator having a detachable glass vessel which is secured to the base portion by means of an L-shaped latch which is contoured to fit within a handle recess when in the closed position and is readily rotated to a released position in which it protrudes outwardly from the handle.

Further objects and advantages will become apparent as the following description proceeds and the features of novelty which characterize the invention will be

BRIEF DESCRIPTION OF THE DRAWINGS

For a better understanding of the present invention, reference may be had to the accompanying drawings in which:

FIG. 2 is an enlarged elevational view of the percolator of FIG. 1 with portions cut away for illustrative purposes and with the glass vessel shown completely in section;

FIG. 3 is a side elevational view similar to FIG. 2 but with the glass vessel removed and shown in dotted lines only and the handle latch shown in the released position;

FIG. 4 is a perspective view of the latch mechanism shown removed from the handle;

FIG. 5 is a bottom plan view of the coffeemaker cover; and

SUMMARY OF THE INVENTION

Figure 1:
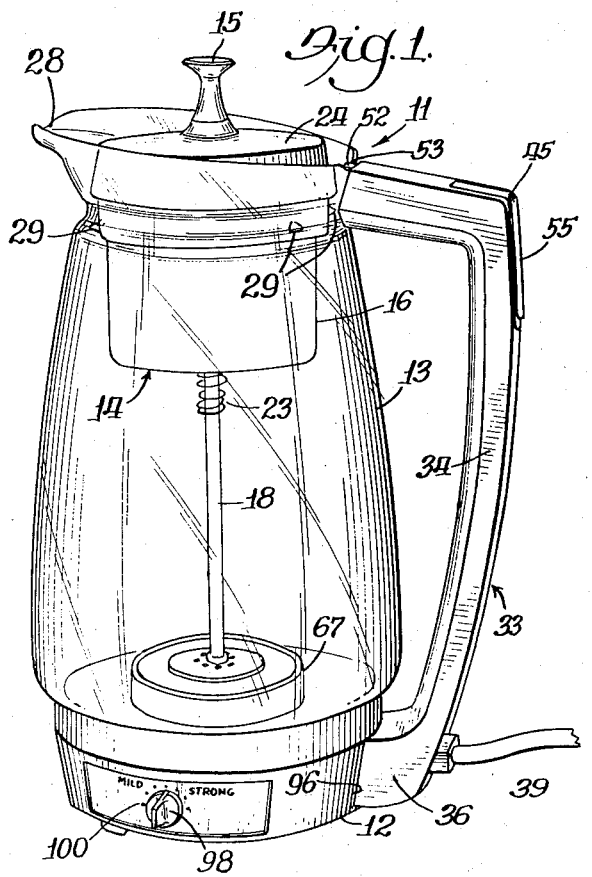
FIG. 1 is a perspective view of an electric percolator embodying our invention.

Referring now to the drawings, there is shown in FIG. 1 a perspective view of the percolator which is designated generally by reference numeral 11. The percolator 11 includes a base assembly 12, a glass vessel 13, a pump and basket assembly 14, and a cover 15. The pump assembly is of a conventional design including a basket 16 which is designed to receive ground coffee and includes perforations 17 in the bottom thereof through which the brewed coffee flows. Water flows upwardly through a tube 18 into the basket 16 where the brewing occurs. At the lower end of the tube 18 is a pump 19 which includes a one-way check valve 20 designed to permit water to enter into the area within the pump 19.

Included as part of the pump 19 is a pump well 22 which is of generally hemispherical configuration and which is heated by means to be described in greater detail below. In the normal brewing of coffee, the water contained within the vessel 13 flows into the well 22 through the check valve 20 where it is heated. When an increment of water within well 22 begins to boil, it passes upwardly through the tube 18 into the basket 16 where the brewing takes place. The cover 15 engages the top of the basket 16 and a helical spring 23 positioned immediately below the basket 16 biases the tube 18 downwardly into seated engagement with the well 22.

The cover 15 comprises an inverted cup-shaped member having a more or less flat top wall 24 to which a knob 25 is attached. Extending downwardly from the outer periphery of the top wall 24 is a side wall 26 which is continuous around the entire periphery of the cover 15 except for a pouring slot 27 which is best shown in FIGS. 2 and 5. The pouring slot 27 is about an inch wide and is adapted to be positioned adjacent a pouring spout 28 which is formed in the top of the side wall of the glass vessel 13. This slot 27 permits coffee to be poured from the vessel 13 while the pump and basket assembly 14 and the cover 15 are retained in the vessel 13. The cover 15 is also provided with protuberances 29 which engage under an annular shoulder 30 formed in the glass vessel 13 and extending around the mouth of the vessel 13. The protuberances 29 extend out sufficiently far that there is a slight interference between protuberances 29 and shoulder 30 as the cover 15 is inserted downwardly into the mouth of the vessel 13.

The pouring slot 27 extending through the side walls 26 has a secondary function in providing a clearance so that the side walls may flex inwardly thereby permitting the protuberances 29 to move downwardly below the shoulder 30 to lock the cover 15 in position. The protuberances thus provide a detent type of action whereby the cover 15 is locked in assembled relation to the vessel 13 but may also be removed easily by merely grasping the knob 25 and lifting upwardly until the protuberances 29 slide over the shoulder 30 in the vessel 13.

The base assembly 12 includes a base portion 32 from the side of which a handle 33 extends upwardly. Handle 33 is a somewhat U-shaped member having an elongated gripping portion 34 forming the bight thereof and at the upper end having a latching portion 35. The bottom of handle 33 forms a supporting portion 36 on which the terminal pins 37 are mounted within a recess 38. Terminals pins 37 are positioned in parallel spaced relation to permit connection to a standard electric power cord 39.

In order to retain the vessel 13 in assembled relation to the base assembly 12, there is provided a latch assembly 42 which is shown in perspective in FIG. 4. The upper end or latching portion 35 of the handle 33 is provided with a recess 43 within which the latch assembly 42 is received. The recess 43 extends along and through the top horizontal portion of the handle and down the vertically extending portion as is best shown in FIG. 3. The latch assembly 42 consists of a resilient latch member 44, an L-shaped lever 45, and a trunnion bracket 46. The trunnion bracket 46 and the latch member 44 are formed with overlapping downwardly extending mounting portions which are secured to the handle by means of an assembly screw 47. A tab 48 which extends from the trunnion bracket 46 through the latch member 44 assures proper alignment between the bracket 46 and member 44. In addition, the opening or slot in member 44 through which tab 48 extends provides a reduced section so that latch member 44 may more readily flex or pivot at that point. The bracket 46 is formed with upwardly extending trunnions 49 each of which has an aperture into which a mounting boss 50 molded integrally with the lever 45 extends. The trunnions 49 are simply spread apart slightly and the lever 45 is assembled thereto by snapping the projections 50 into engagement with the trunnions 49.

The latch member 44 has an elongated central portion 51 at the outer end of which extends a hook 52 which is adapted to be biased downwardly into engagement with a slight step or depression 53 in the upper edge of the vessel 13. The hook 52 on the latch member 44 is provided with a suitable resilient plastic coating in order to prevent chipping or damage to the upper edge of the glass vessel 13.

The lever 45 is generally L-shaped and adapted to pivot about the integrally formed bosses 50 which engage the trunnions 49. Extending outwardly from the lever 45 adjacent to the bosses 50 is a cam projection 54 which is best shown in FIG. 2. Cam portion 54 of the lever 45 is adapted to engage the central portion 51 of the latch member 44 to bias it downwardly into latching engagement with the upper edge of the vessel 13 as is shown in FIG. 2. The latch member 44 is formed so that its natural resilience urges it to a raised or disengaged position as shown in FIG. 3. The latch member 44 may only assume this position, however, when a downwardly extending manual actuating portion 55 of lever 45 is pivoted upwardly to an almost horizontal position. The resilience of the latch member 44 actually causes the lever 45 to be held in this raised position. When lever 45 is pivoted by pushing inwardly and downwardly on the manually actuating portion 55, the lever 45 is rotated clockwise as shown in FIGS. 2 and 3 until it moves to a position in which it is entirely received within the recess 43.

In that the force applied by the member 44 upwardly against the cam portion 54 is to the left of the center of the pivot at boss 50, the latch member lever 45 is maintained in the latched position shown in FIG. 2 even after finger pressure is removed from the actuating portion 55. In this position the cam portion 54 is engaged with the central portion 51 of the latch member 44 and the hook 52 is engaged with the upper edge of the vessel 13 in the depression 53. The cam portion 54 engagement causes the central portion 51 of member 44 to be flexed so as to apply a downwardly biasing force. The latch assembly 42 is obviously very simple in design including only the three molded and stamped parts, the latch member 44, the lever 45, and the trunnion bracket 46. It is only necessary to slide one's finger under the lower edge of the manual actuating portion 55 and lift the lever 45 upwardly to disengage the latch. When the latch member 44 is in the disengaged position shown in FIG. 3, the hook 52 is spaced well above the vessel 13 permitting easy removal of the vessel 13. In addition, the manual actuating portion 55 extends outwardly in a very prominent position so as to announce to the user that the latch is disengaged from the vessel 13. This serves to prevent accidental use of the percolator in instances when the vessel 13 has not been completely assembled and latched to the base assembly.

In connection with the mounting of the pump well 22 and its associated heaters and control mechanism with respect to the base portion 32, there is provided a heater assembly 58 which includes the pump well 22, an annular plate support 59 and a heater retainer 60. The pump well 22 has a hemispherical central portion 61 within which the water is heated, and extending outwardly from the upper edge of the hemispherical well portion 61 is an annular wall 62 and a downwardly depending wall 63 which defines a somewhat annular heater chamber 64. The side wall 63 is formed with a lower lip or flange 65 and an upper shoulder 66 which together form a channel on the outer surface of the pump well 22 which receives a sealing gasket 67. The outer surface of the gasket 67 engages the inner edge of a hole 68 formed in the bottom wall of the vessel 13. A suitable sealant or gasket may be used between the flange 65 and the annular plate 59 to prevent any leakage into the chamber 64 even though the gasket 67 tends to prevent any such leakage.

As was stated above, the base assembly 12 includes the plastic base portion 32 and the heater assembly 58. The plastic base portion 32 is a shallow cup-shaped, molded plastic part having peripheral side walls 89 and a bottom wall 90. The bottom wall 90 is formed with integrally molded feet 91 which support the coffeemaker 11 in spaced relation to a supporting surface. The bottom wall 90 is also formed with a recess 92 into which the assembly stud 76 extends and within which the nut 78 and spring washer 79 are positioned.

Figure 6:
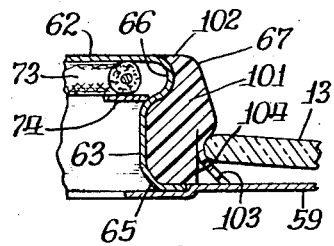
FIG. 6 is an enlarged sectional view of the gasket seal between the metallic well and the glass vessel.

The upper edge of the side wall 89 of base portion 32 is formed with a narrow shoulder 93 over which a downwardly turned flange 94 on the edge of plate 59 extends. When the assembly nut 78 is tightened into engagement with spring washer 79 and the bottom wall of the base portion 32, the heater assembly 58 is drawn downwardly against the base portion 32 with the downwardly turned flange 94 overlapping the shoulder 93 and with the upper edge of shoulder 94 engaging the flat portion of annular plate 59 as shown in FIGS. 2 and 6. The heater assembly 58 and the base portion 32 together form a chamber 95 within which a suitable thermostat and lead connections are concealed. As is evident from FIG. 2, the base portion 32 is very shallow thereby contributing little to the overall depth or height of the coffeemaker 11 and thus permitting a maximum capacity vessel 13 while still maintaining the overall height within conventionally accepted limits.

The side wall 89 of the base portion 32 is provided with a slot or opening 96 through which the support portion 36 of the handle 33 extends. Suitable assembly bolts 97 secure the plastic handle 33 in assembled relation to the base portion 32.

For the purpose of adjusting the thermostat, a control knob 98 is mounted on the side wall 89 of base portion 32. Suitable indicia 100 are provided on the outer wall 89 to be used in conjunction with the knob in setting the thermostat. The strength of the coffee brewed in the coffeemaker 11 may be controlled by increasing the temperature level at which the thermostat opens disconnecting the heating element 69.

The pump well 22 has been made of fairly substantial diameter in order that the heating element 69 might be constructed and mounted in good heat transfer relationship with well portion 61 and so that the thermostat as well as the keep warm element 73 could also be mounted against the annular wall 62 in good heat transfer relation to the liquid within the vessel 13. Thus, the thermostat will respond more accurately to the temperature of the liquid and be less affected by the heating element 69. In order to obtain this improved thermal relationship between the heaters 69 and 73 as well as the thermostat, it was necessary to make the well 22 of greater diameter than would be desirable from the standpoint of making any easy seal between the well 22 and the vessel 13. It should be evident that as the diameter of the hole 68 in the vessel 13 is increased, the difficulty in making an effective seal is also increased. The gasket 67, however, provides an easily engaged and very effective seal between the pump well 22 and the vessel 13.

The gasket 67 is an annular member which is received in the channel formed in wall 63 between the flange 65 and the shoulder 66. In section, as shown in FIG. 6, the gasket 67 may be considered as having a central body portion 101, an upper lip 102, and a sidewardly extending skirt 103 which skirt is positioned adjacent a recessed or undercut portion 104. The lip 102 is angled inwardly so as to blend with and seal against the outer surface of the pump well 22. The rounded edge of the lip 102 facilitates assembling the vessel 13 since it acts to more or less target the opening 68 of vessel 13 onto the gasket 67. Extending downwardly from lip 102, the body portion 101 is tapered outwardly slightly so that as the vessel 13 is urged downwardly on the gasket 67, there is an increasing pressure or interference between the inside diameter of the hole 68 and the outer surface of the gasket 67. Toward the bottom of the gasket 67 there is an undercut or recessed portion 104 adjacent to which the skirt 103 extends outwardly. As the vessel 13 reaches its limit of movement downwardly and bottoms against the annular plate 59, the vessel portion defining the hole 68 slides below the thickest part of the body portion 101 into flexing engagement with the skirt 103 urging the skirt into the recessed portion 104. As a consequence of this action, the central body portion 101 tends to lock the vessel 13 downwardly in engagement with the plate 59 providing what might be characterized as a detent action to maintain the seal. In addition, the elongated sloping outer surface of the gasket 67 provides somewhat of a cork-type of action in which increased compression of the gasket is achieved because of the slight angle on the exterior surface of the gasket 67. Thus, the gasket 67 achieves a tight seal and at the same time, because of the undercut 104 and the fact that the opening 68 of the vessel 13 seals below the widest portion of the gasket 67, there is a tendency for the vessel 13 to be locked in sealed engagement with the gasket 67. Tests have indicated that the locking effect provided by the seal is substantial enough so that the vessel 13 will remain assembled to the base assembly 12 even when the vessel is tilted with a capacity amount of coffee in the vessel 13 and when the latch member 44 is in the disengaged position.

In spite of this tight seal and the locking effect provided by the gasket 67, it is relatively easy to disconnect the vessel 13 from the base assembly by merely lifting one edge upwardly so as to lift the bottom of the vessel 13 out of the undercut 104 and begin the peripheral disengagement of the vessel 13 from the gasket 67. The inward slope on the outer surface of the gasket 67 results in the vessel sliding upwardly easily once a portion of the bottom wall is moved out of the undercut area 104. Accordingly, in spite of the substantial diameter of the pump well 22, there is achieved a leak proof seal at the gasket 67 which is made easily upon assembly of the vessel 13 to the base assembly 12 and is easily broken upon disassembly of the vessel 13.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. In a coffee percolator of the type having a glass vessel, the improvement comprising a base assembly for supporting said vessel with a portion sealed in an opening in the bottom of said vessel, a handle extending upwardly from said base assembly and having a gripping portion in spaced relation to said vessel, a latch portion at the top of said handle extending into detachable engagement with the top edge of said vessel, said portion including an elongated resilient latch member being supported on said handle and having an unsupported end extending to a position spaced above said vessel top edge in an unstressed condition, a hook on the unsupported end of said member, an L-shaped lever pivoted to said handle and movable between a first position in engagement with said member between said hook and said handle biasing said hook into latching engagement with said top edge and a second position in which said biasing force on said member is released, said lever in said first position being completely received in a handle recess with one leg thereof extending downwardly along the gripping portion of said handle, in said second position said lever being withdrawn from said recess and having said one leg extending outwardly of said gripping portion at the top of the handle.

2. The combination of claim 1 wherein said handle is U-shaped having two spaced legs and a bight with said gripping portion being at the bight thereof, the lowermost leg of said handle extending into and being secured to said base assembly, said latch portion including the uppermost leg of said handle with said recess extending lengthwise in said uppermost leg and downwardly into said gripping portion.

3. The combination of claim 2 wherein said handle recess comprises a passageway through which said latch member extends and an open channel within which said L-shaped lever is received, said lever in said first position lying flush with the top of said channel and closing said channel.

4. A coffeemaker comprising a base having a handle extending upwardly therefrom, a vessel supported on said base and being retained thereon by a latch extending from the upper end of said handle into engagement with said vessel, said handle having a vertically extending gripping portion and a horizontal latch supporting portion extending inwardly from the top of said gripping portion, an L-shaped actuating lever for said latch pivoted to said latch supporting portion, said lever in a latching position having one leg extending horizontally in a channel recess in said latch supporting portion and another leg extending vertically in a channel recess in said gripping portion, said lever being movable to an unlatched position in which it is withdrawn from said recesses and extends outwardly from the top of said handle above said gripping portion.

5. The coffeemaker of claim 4 wherein said L-shaped lever is provided with a cam extending from said one leg adjacent the axis about which said latch is pivoted to said supporting portion, a latch member being attached to said handle at a position spaced from said vessel and having a portion extending within said latch supporting portion of said handle into engagement with said vessel, said member being biased upwardly out of engagement with said vessel, said cam moving said member into engagement with said vessel when said lever is in said latching position.

6. A coffeemaker comprising a vessel having a mouth with a shoulder defining a circular opening, a pouring lip extending upwardly and outwardly from said shoulder, an opening in the bottom of said vessel, a base assembly for supporting said vessel and a portion sealed in said vessel opening, a handle extending upwardly from said base assembly and having a gripping portion in spaced relationship to said vessel, a latch portion atop said handle extending into detachable engagement with the top edge of said vessel, said latch portion including a resilient latch member mounted on said handle at a position spaced from said vessel and having a portion extending from said handle to a position above said top edge in an unstressed condition, an L-shaped lever pivoted to said handle and movable between a first position engaging said member between said vessel and said handle stressing said member into engagement with said edge, and a second position in which said stress on said member is released.

7. The combination of claim 6 wherein said lever in said first position being completely received in a handle recess with one leg thereof extending downwardly along the gripping portion of said handle, in said second position said lever being withdrawn from said recess and having said one leg extending outwardly of said gripping portion.

* * * * *